(12) United States Patent
Suzuki

(10) Patent No.: US 7,251,861 B2
(45) Date of Patent: Aug. 7, 2007

(54) ELECTRONIC EQUIPMENT

(75) Inventor: Takahiro Suzuki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 186 days.

(21) Appl. No.: 10/767,983

(22) Filed: Jan. 29, 2004

(65) Prior Publication Data
US 2004/0226142 A1    Nov. 18, 2004

(30) Foreign Application Priority Data
May 13, 2003   (JP)   ............. P.2003-133928

(51) Int. Cl.
*A45F 5/10*    (2006.01)
(52) U.S. Cl. ............ 16/441; 16/442; 16/433; 74/553
(58) Field of Classification Search ........ 16/441, 16/442, 433; 200/341, 345, 334, 336; 74/553
See application file for complete search history.

(56) References Cited

U.S. PATENT DOCUMENTS

| | | | | |
|---|---|---|---|---|
| 2,797,592 A | * | 7/1957 | Marrapese | 74/548 |
| 3,513,720 A | | 5/1970 | Allport | |
| 4,197,765 A | * | 4/1980 | Shimoda | 74/553 |
| 5,469,758 A | * | 11/1995 | Howie, Jr. | 74/553 |
| 5,509,174 A | * | 4/1996 | Worrell | 16/441 |
| 5,688,461 A | * | 11/1997 | Howie, Jr. | 264/273 |
| 5,752,759 A | * | 5/1998 | Pizzo | 362/26 |
| 6,019,478 A | * | 2/2000 | Pizzo | 362/26 |
| 6,242,064 B1 | * | 6/2001 | Howie, Jr. | 428/35.7 |
| 6,499,191 B1 | * | 12/2002 | Howie, Jr. | 16/441 |
| 6,512,189 B1 | * | 1/2003 | Schuberth et al. | 200/334 |
| 2003/0163903 A1 | * | 9/2003 | Rodawold | 16/441 |

FOREIGN PATENT DOCUMENTS

| | | | |
|---|---|---|---|
| DE | 12 78 860 B | | 9/1968 |
| DE | 29 41 626 A | | 4/1981 |
| GB | 2046192 A | * | 11/1980 |
| JP | 2000-108725 | | 4/2000 |
| JP | 2001-039250 | | 2/2001 |
| JP | 2001-266704 | | 9/2001 |
| JP | 2004338427 A | * | 12/2004 |

* cited by examiner

*Primary Examiner*—Brian E. Glessner
*Assistant Examiner*—Mark Williams
(74) *Attorney, Agent, or Firm*—Pearne & Gordon LLP

(57) ABSTRACT

The present invention provides an electronic equipment has an operation tool with crashing function. An operation tool 3 is supported on an encoder 5 serving as a support member. In the operation tool 3, an outer knob 9 serving as an operation portion is to be operated by an operator. A mounting cylindrical portion 19 serving as a mounting portion is formed such that it has a clearance S with respect to the outer knob 9 in the impact acting operation. And, a crashable connecting portion 21 connects together the operation portion and mounting portion and can be crashed due to an impact given to the operation portion to thereby allow the operation portion to move with respect to the mounting portion. The crashable connecting portion 21 extends radially from the mounting cylindrical portion 19 and is connected to the outer knob 9 and includes plural bridge portions formed radially.

5 Claims, 7 Drawing Sheets

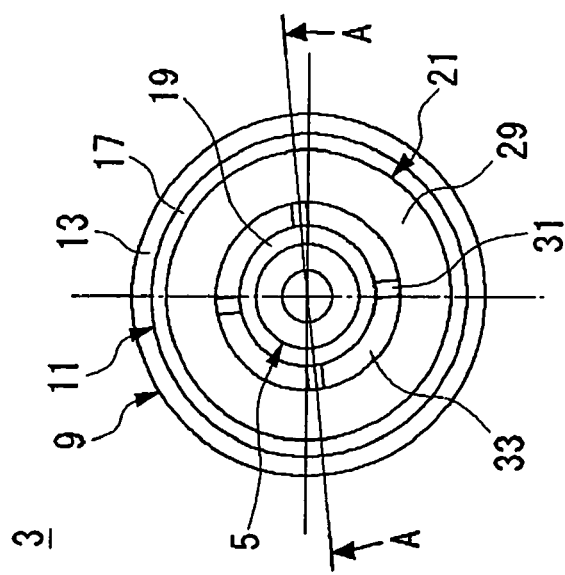
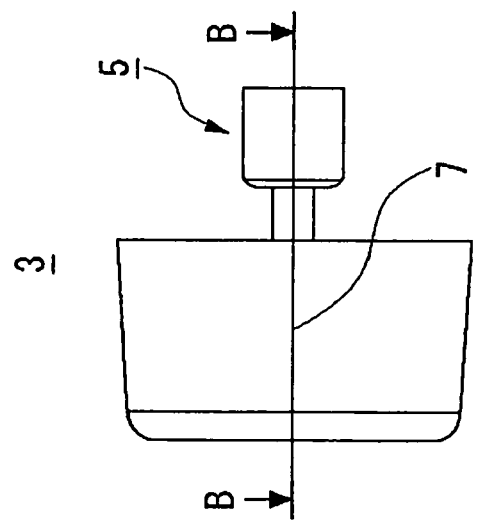
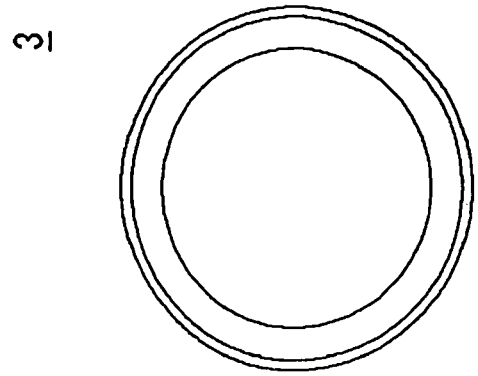

C-C

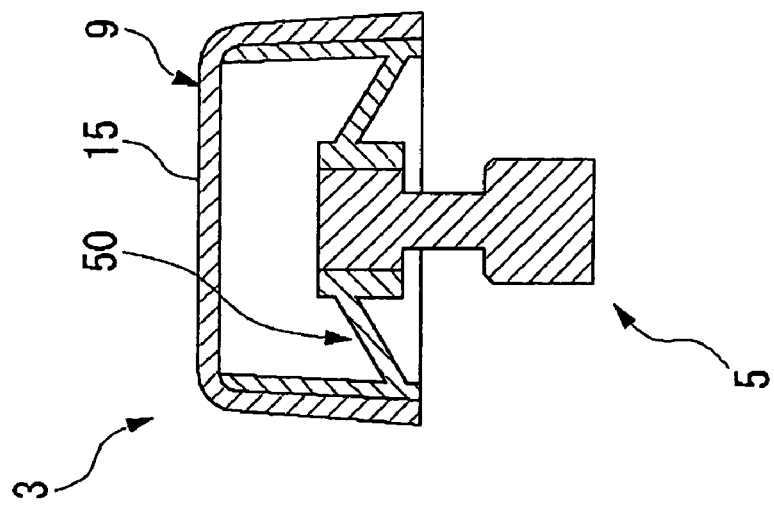
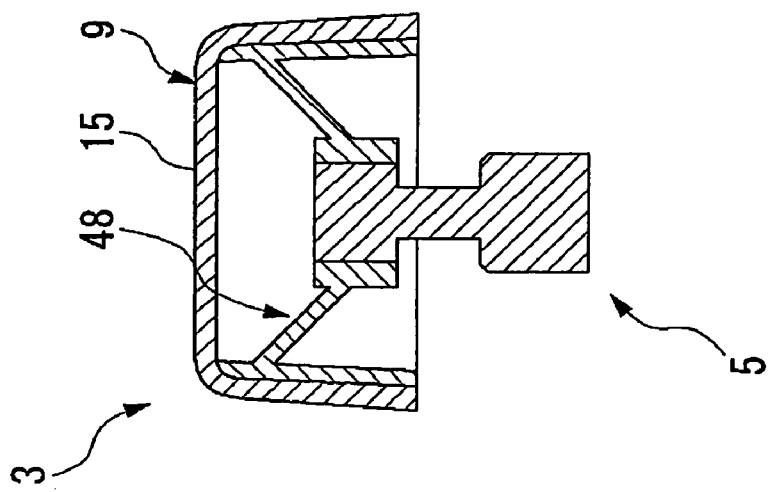
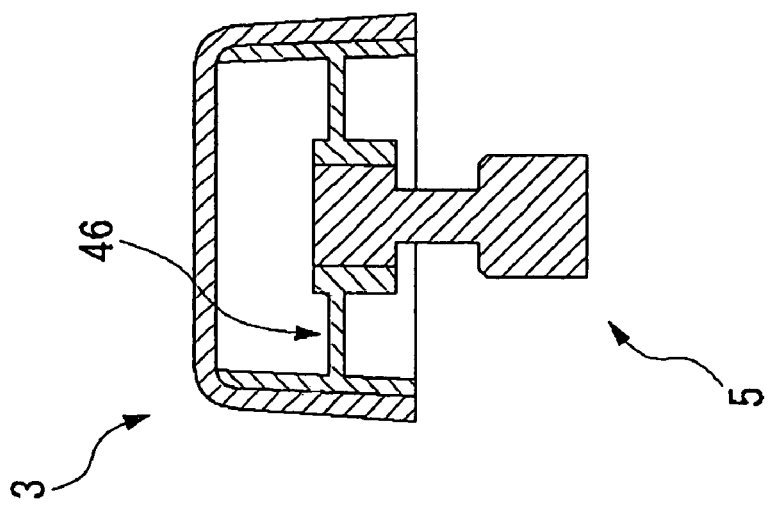

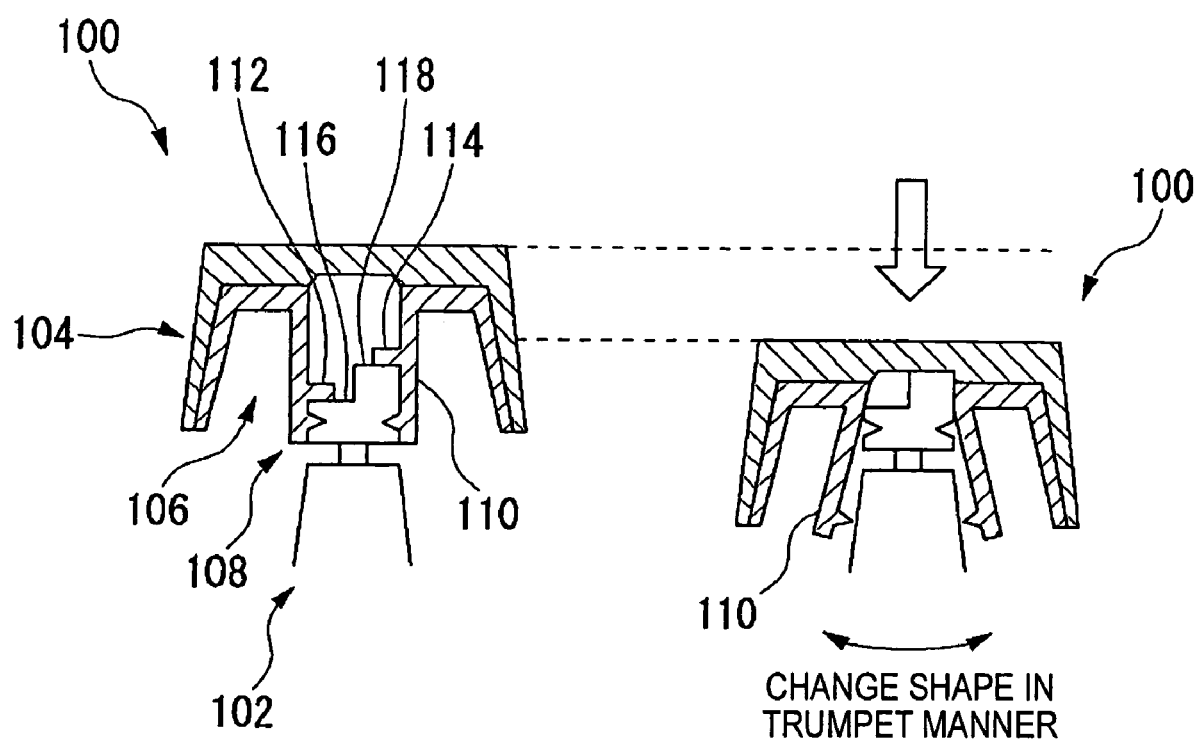

ELECTRONIC EQUIPMENT

BACKGROUND OF THE INVENTION

1. Field of the Invention

The invention relates to an electronic equipment such as a car audio and, in particular, to an electronic equipment including an operation tool structured such that it can be crashed against an impact.

2. Description of the Related Art

In order to enhance the safety of an occupant in a vehicle collision, there is a requirement for safety in an apparatus such as an audio to be incorporated into an instrument panel within a vehicle room. For example, in Europe, assuming that an occupant can collide with an operation tool such as a knob in a vehicle collision, there is established a standard that the operation tool such as a knob must be dented when a certain impact load is applied thereto. In order to be able to meet such standard, conventionally, the operation tool is structured such that it can be crashed against an impact to thereby reduce the degree of the projection of the operation tool from the front surface of the electronic equipment in which the operation tool is incorporated (For example, the patent reference 1: JP-A-2001-266704 (Page 3, FIGS. 1, 2)).

Here, FIGS. 8A and 8B show an example of an operation tool in a related art. An operation tool 100 is a volume knob of a car audio and is supported by an encoder 102 which is used to detect the angle of the knob. FIG. 8A shows the operation tool 100 in its normal state and FIG. 8B shows the operation tool 100 when it is crashed.

The operation tool 100 is composed of an outer knob 104 and an inner knob 106 which are both made of resin. The outer knob 104 has a cylindrical shape, while it can be picked up and rotated by an operator. The inner knob 106 is fitted with the inside of the outer knob 104. And, the inner knob 106 includes a mounting portion 108 to be mounted on the encoder 102.

The mounting portion 108 has a tube portion 110 which can be fitted with the outside of the encoder 102. The tube portion 110 has an engaging projection 111 for prevention of removal, while the engaging projection 111 can be engaged with the encoder 102.

Also, the tube portion 110 includes, on its inner surface, two crashable projections 112, 114. The crashable projections 112, 114 are disposed at positions which correspond to the stepped end faces 116, 118 of the encoder 102, while they can be contacted with these end faces 116, 118.

As shown in FIG. 8B, when the body of the occupant collides with the operation tool 100 in a vehicle collision, an impact force acts in the arrow mark (in FIG. 8B) direction and, due to the impact force, the crashable projections 112, 114 are bent, thereby removing a restraint on the movement of the mounting portion 108 toward the encoder 102. Accordingly, the operation tool 100 is allowed to move toward the encoder 102 and thus the operation tool 100 is dented, thereby satisfying the requirement for the collision safety of the occupant.

However, in the case of the conventional operation tool 100 shown in FIG. 8, since the two crashable projections 112, 114 are disposed on the mounting portion 108 and thus there are provided the mounting function and the crashing function in the same portion, there is a possibility that the two functions are not easy to coexist with each other. The crashing function means a function by which, in a collision, the operation tool can be crashed and the projection of the operation tool can be thereby reduced as required. On the other hand, the mounting function means a function by which the operation tool can be supported positively, that is, the shaking motion of the operation tool can be controlled within the required range.

Here, describing the above problem further with reference to FIGS. 8A and 8B further, in a vehicle collision, the crashable projections 112, 114 are broken in the mounting portion 108 to thereby remove the mounting of the mounting portion 108 with respect to the encoder 102, so that the mounting portion 108 moves toward the encoder 102 and the whole of the operation tool 100 also moves toward the encoder 102. That is, to secure the crashing function, removal of the mounting of the mounting portion 108 due to the crash of the crashable projections 112, 114 is necessary, which limits the strength of this mounting portion 108. Accordingly, there is a limit on the reinforcement of the mounting portion 108 from the viewpoint of prevention of the shaking motion of the operation tool.

Also, according to the structure shown in FIGS. 8A and 8B, when the mounting portion 108 advances toward the encoder 102, the tube portion 110 advances while spreading in a trumpet manner. In case where the tube portion 110 does not cause such trumpet-like spreading deformation, the tube portion 110 will be butted against the encoder 102. Therefore, to secure the crashing function, the tube portion 110 must be weak to such a degree that the above-mentioned spreading deformation is possible. Specifically, the thickness of the tube portion 110 is limited. Therefore, there is a limit on the enhancement in the rigidity of the tube portion 110 from the viewpoint of prevention of the shaking motion.

In this manner, in the conventional structure, the mounting and crashing portions are formed integral with each other, whereas the requirements for the mounting and crashing functions do not agree with each other. And, there exists a trade-off relationship that, in case where one of the two functions is enhanced, the other function is degraded. This means that, in some cases, the two functions are difficult to be compatible. Also, in case where much importance is attached to the crashing function for enhancement in the occupant safety, it is difficult to enhance the mounting function, so that it is sometimes not easy to reduce the shaking feeling of the operation tool.

SUMMARY OF THE INVENTION

The present invention aims at eliminating the drawbacks found in the above-mentioned electronic equipment of the related art. Accordingly, it is an object of the invention to provide an electronic equipment which not only can secure the sufficient crashing function of the operation tool but also can enhance the mounting function thereof.

In attaining the above object, according to the invention, there is provided an electronic equipment including an operation tool to be mounted on a support member, wherein the operation tool has an operation portion to be operated by an operator; a mounting portion formed spaced apart from the operation portion in a direction where an impact is applied to the operation tool, the mounting portion being arranged to be mounted on the support member; and a crashable connecting portion for connecting together the operation portion and the mounting portion and also for allowing the operation portion to move with respect to the mounting portion by that said crashable connecting portion is crashed due to an impact given to the operation portion.

According to this structure, since there is disposed the crashable connecting portion, the portion of the operation tool for fulfilling the crashing function is separated from the mounting portion thereof. When an impact is given to the operation tool, due to the crash of the crashable connecting portion, the operation portion is allowed to move with respect to the mounting portion, thereby allowing the operation portion to be dented. Even in case where the mounting portion is positively mounted on the support member, the above-mentioned denting operation can be carried out properly. Thanks to this, while securing the crashing function, the mounting function can be enhanced.

Also, in an electronic equipment according to the invention, the crashable connecting portion is formed so as to extend radially from the mounting portion mounted on a shaft and is connected to the operation portion.

According to this structure, the crashable connecting portion can be structured such that it is strong in a direction perpendicular to the shaft and is weak in the axial direction, that is, in the crashing direction. The radially extending crashable connecting portion may be perpendicular or oblique to the shaft.

Also, according to the invention, the crashable connecting portion includes two or more bridge portions which are formed radially in a clearance existing between the mounting portion and operation portion so as to connect together these two portions.

In this structure, since there are formed the two or more bridge portions in the crashable connecting portion, the crashable connecting portion can be structured such that it is properly weak in the axial direction, that is, in the crashing direction.

According to the invention, each of the bridge portions has a section shape the thickness of which in a direction along the shaft is smaller than the width thereof in a direction perpendicular to the shaft.

In this structure, since the section shape of the bridge portion is set in the above-mentioned manner, the crashing-direction strength of the bridge portion is lowered, thereby being able to properly set the impact force that is generated when the crash occurs.

According to the invention, the crashable connecting portion has a bent portion between the mounting portion and operation portion. Alternatively, the bent portion may also be formed in the bridge portion.

In this structure as well, since the bent portion is formed, the crashing-direction strength of the bridge portion is lowered, thereby being able to properly set the impact force that is generated when the crash occurs.

According to the invention, the crashable connecting portion has a cut-away portion between the mounting portion and operation portion.

In this structure as well, since the cut-away portion is formed, the crashing-direction strength of the bridge portion is lowered, thereby being able to properly set the impact force that is generated when the crash occurs. By the way, a typical example of the cut-away portion is a groove. For example, in case where the operation tool is made of resin, the groove may be formed when the operation tool is molded of resin. Also, the cut-away portion may be composed of a slit.

Also, an electronic equipment according to the invention comprises an outside piece including an outer tube portion constituting the operation portion and an inside piece including an inner tube portion to be fitted with the outer tube portion, and the inside piece has a structure that the inner tube portion and mounting portion situated on the inner peripheral side thereof are connected together by the crashable connecting portion.

According to this structure, when obtaining a structure in which there is secured a clearance allowing the operation portion and mounting portion to move with respect to each other, it is not necessary to use a slide mold or the like, which can facilitate the manufacture of the operation tool.

BRIEF DESCRIPTION OF THE DRAWINGS

FIGS. 3A to 3C are external views of an operation tool in an electronic equipment according to the embodiment of the invention;

FIGS. 7A to 7C are sectional views of a third modification of an operation tool in an electronic equipment according to the embodiment of the invention; and FIGS. 8A and 8B are sectional views of an operation tool in a conventional electronic equipment.

Figure 1:
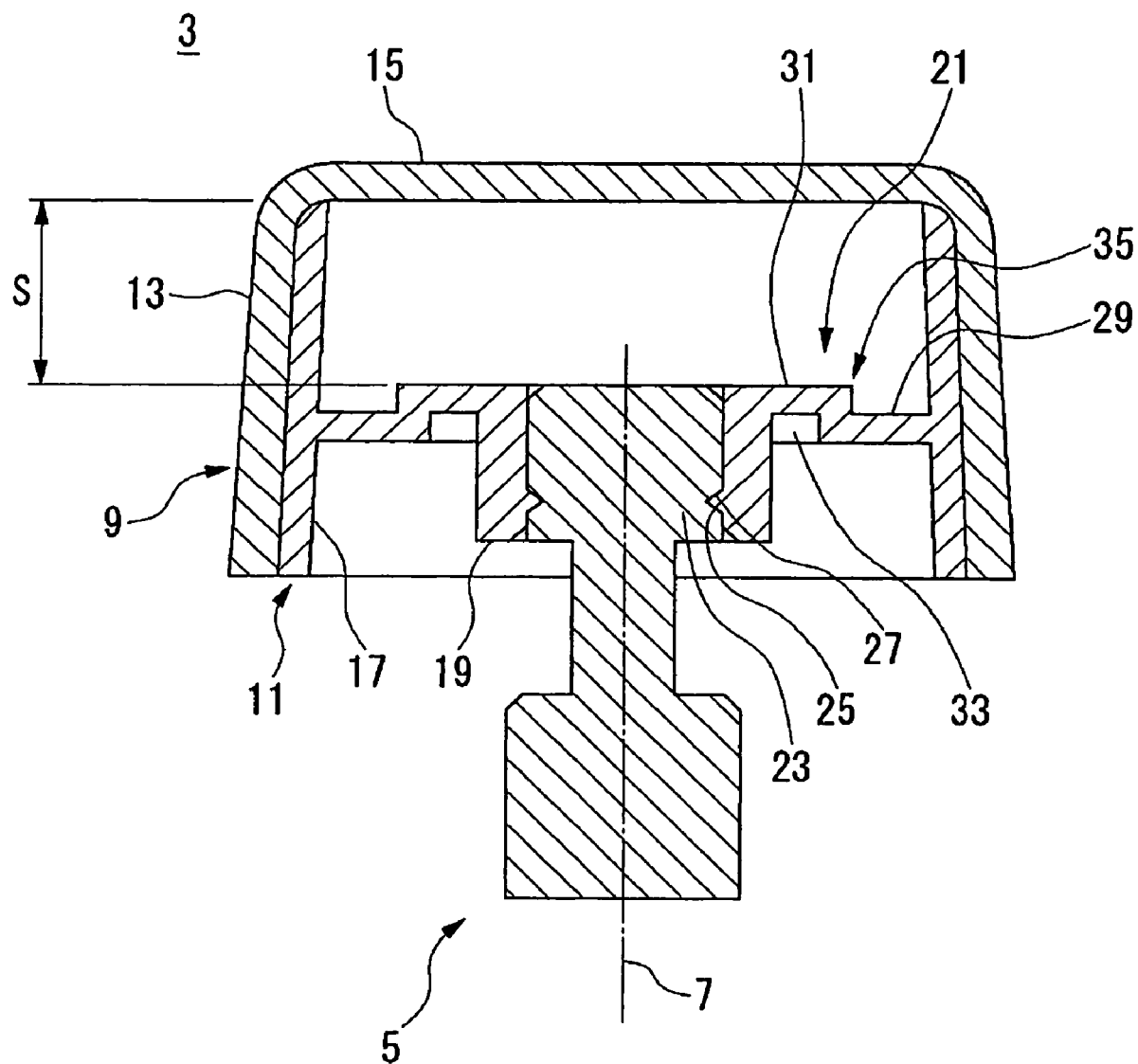
FIG. 1 is a sectional view of an operation tool in an electronic equipment according to an embodiment of the invention.

In the drawings, a reference numeral 1 refers to an electronic equipment; 3 to an operation tool; 5 to an encoder; 7 to a rotation axis; 9 to an Outer knob; 11 to an inner knob; 13 to an outside cylindrical portion; 15 to a front plate portion; 17 to an inside cylindrical portion; 19 to a mounting cylindrical portion; 21 to a crashable connecting portion; 23 to a knob mounting shaft; 25 to an engaging projection; 27 to engaging groove; 29 to a ring-shaped plate portion; 31 to a bridge portion; 33 to a clearance; and 35 to a bent portion.

DETAILED DESCRIPTION OF THE PREFERRED EMBODIMENTS

Now, description will be given below of an embodiment of an electronic equipment according to the invention with reference the accompanying drawings.

Figure 4:
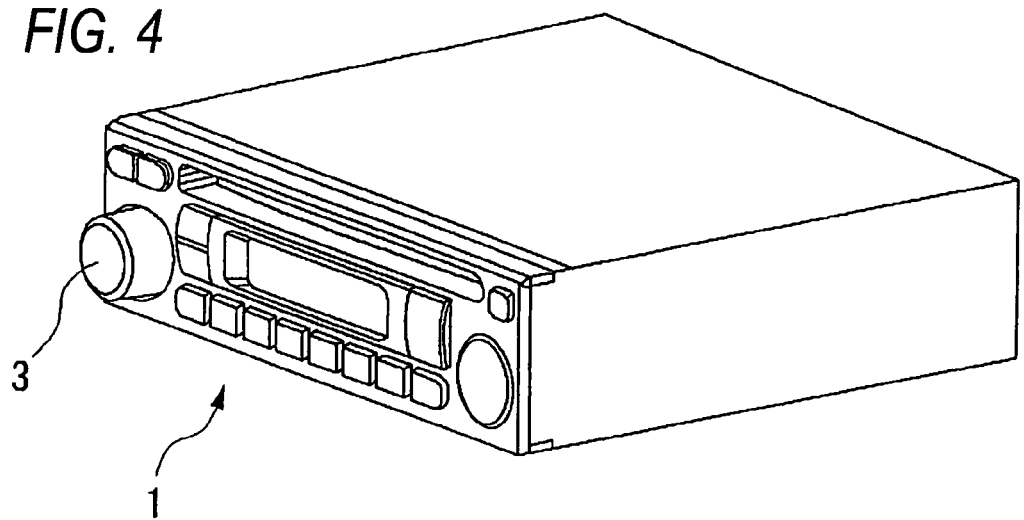
FIG. 4 is a perspective view of an electronic equipment according to the embodiment of the invention, showing a state in which an operation tool is mounted thereon.

FIGS. 1 to 3C show an operation tool according to an embodiment of the invention, while FIG. 4 shows an electronic equipment into which the present operation tool is incorporated. As shown in FIG. 4, according to the present embodiment, an electronic equipment 1 is a car audio, and an operation tool 3 is a volume knob of the car audio.

Figure 2:
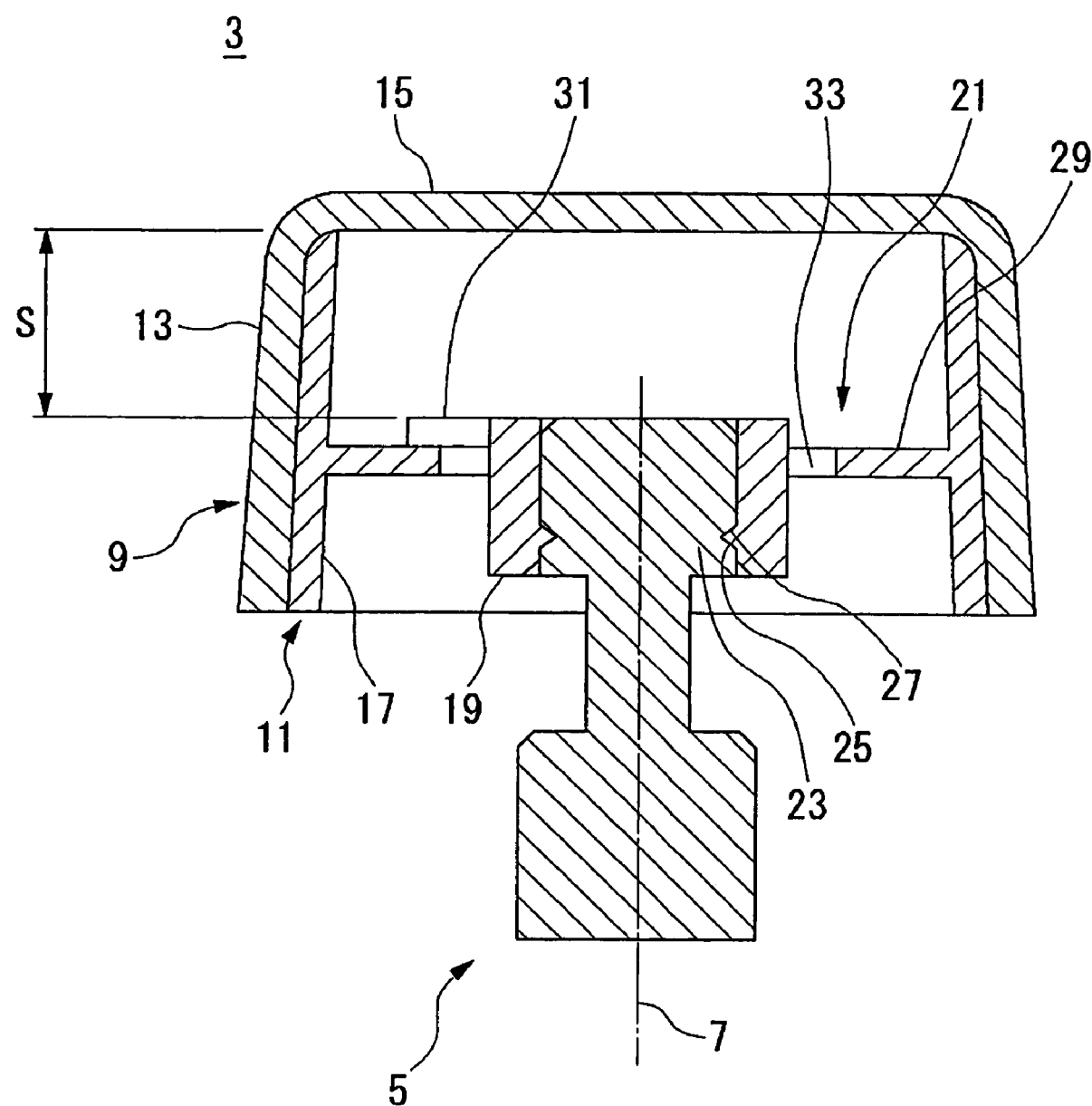
FIG. 2 is a sectional view of an operation tool in an electronic equipment according to the embodiment of the invention.

FIGS. 3A to 3C are external views of the operation tool 3. FIGS. 1 and 2 are respectively sectional views taken along the line A-A and line B-B shown in FIGS. 3B and 3C.

As shown in these figures, the operation tool 3 is supported on an encoder 5 which is a support member for detecting the rotation angle of the operation tool 3, and can be rotated about the rotation axis 7 of the encoder 5. And, the operation tool 3 has a two-piece structure which is composed of an outer knob 9 made of resin serving as an operation portion and an inner knob 11 serving as a mounting portion.

The outer knob 9 corresponds to the outside makeup portion of the operation tool 3 and has a cap-like shape composed of an outside cylindrical portion 13 and a front plate portion 15. And, the front plate portion 15 of the outer knob 9 is situated on the front surface of the operation tool and faces an operator.

On the other hand, the inner knob 11 is composed of an inside cylindrical portion 17, a mounting cylindrical portion 19 and a crashable connecting portion 21 for connecting together the two portions 17 and 19. The inside cylindrical portion 17 has a shape which can be fitted with the inside of the outside cylindrical portion 13 of the outer knob 9 and, as shown in the above figures, the outside cylindrical portion 13 and inside cylindrical portion 17 are set substantially equal to each other in the rotation-axis-direction length thereof. The inside cylindrical portion 17 is pressure inserted into the outside cylindrical portion 13, whereby the inner knob 11 and outer knob 8 can be fixed to each other.

The mounting cylindrical portion 19 is situated inside the inside cylindrical portion 17, the mounting cylindrical portion 19 and inside cylindrical portion 17 are concentric with each other, and the centers of these two cylindrical portions are coincident with the rotation axis 7. The mounting cylindrical portion 19 has a shape that can be fitted with the outside of a knob mounting shaft 23 corresponding to the rotation shaft 7.

The mounting cylindrical portion 19 is mounted on the knob mounting shaft 23 by a rotation preventive structure in such a manner that it cannot be rotated with respect to the knob mounting shaft 23. Due to such unrotatable mounting of the mounting cylindrical portion 19, according to the present embodiment, part of the cylinder of the knob mounting shaft 23 is scraped to thereby provide a flat portion (not shown). In the inner peripheral surface of the mounting cylindrical portion 19 as well, there is provided a flat portion having a complementary shape and, in case where these two flat portions are engaged with each other, the rotation of the mounting cylindrical portion 19 with respect to the knob mounting shaft 23 can be prevented.

Further, the mounting cylindrical portion 19 is also prevented from moving in a direction along the rotation axis 7 with respect to the knob mounting shaft 23. That can be realized by a flat portion which can be formed by scraping the knob mounting shaft 23. That is, in the end portion of this flat portion, there is formed a step and, in this step portion, the mounting cylindrical portion 19 and knob mounting shaft 23 are contacted with each other in a direction along the rotation axis 7, thereby being able to prevent the mounting cylindrical portion 19 from moving in a direction along the rotation axis 7.

Also, the inside diameter of the mounting cylindrical portion 19 is slightly smaller than the outside diameter of the knob mounting shaft 23 of the encoder 5 and, therefore, the knob mounting shaft 23 can be pressure inserted into the mounting cylindrical portion 19. And, as shown in the above figures, the mounting cylindrical portion 19 has an engaging projection 25 projecting from the inner peripheral surface thereof and the engaging projection 25 is engaged with the engaging groove 27 of the knob mounting shaft 23 of the encoder 5, thereby being able to prevent the operation tool 3 against removal. Further, the thickness of the mounting cylindrical portion 19 is set so as to be able to obtain sufficient rigidity. According to the present embodiment, since there is not necessary the trumpet-shaped spreading deformation of the mounting cylindrical portion 19 when it is crashed, the thickness of the mounting cylindrical portion 19 can be set large. Thanks to the above structure, the mounting cylindrical portion 19 can be mounted onto the encoder so strongly that the operation tool 3 can be prevented from shaking.

Next, description will be given below of the structure of the crashable connecting portion 21. As shown in FIG. 1 and FIG. 3C, the crashable connecting portion 21 connects the inside cylindrical portion 17 of the inner knob 11 with the mounting cylindrical portion 19 situated on the inner peripheral side of the inner knob 11, while the crashable connecting portion 21 is composed of a ring-shaped plate portion 29 and a bridge portion 31. The ring-shaped plate portion 29 is projected from the inner peripheral surface of the inside cylindrical portion 17 toward the center of the inner knob 11 and extends at right angles to the rotation axis 7.

The ring-shaped plate portion 29 does not reach the mounting cylindrical portion 19 but there is a clearance 33 between the ring-shaped plate portion 29 and mounting cylindrical portion 19. The bridge portion 31 is disposed in this clearance 33, and the bridge portion 31 connects together the ring-shaped plate portion 29 and mounting cylindrical portion 19. The bridge portion 31, as shown in the above figures, has a shape like a relatively short rod. And, there are disposed four bridge portions 31 at regular intervals along the circumferential direction of the inner knob 11.

Also, the crashable connecting portion 21 has a bent portion 35 in the end portion of the bridge portion 31. In more detail, as shown in FIG. 1, the bridge portion 31 and ring-shaped plate portion 29 are disposed in such a manner that they are shifted from each other in the direction of the rotation axis 7 and, specifically, the bridge portion 31 is situated nearer to the front plate portion 15 of the outer knob 9 than the ring-shaped plate portion 29. Therefore, the crashable connecting portion 21 is structured such that, when it is viewed from the outside toward the inside, in the terminal end of the ring-shaped plate portion 29, that is, in the start end of the bridge portion 31, it is bent toward the front plate portion 15, is then bent again toward the rotation axis 7, and leads to the mounting cylindrical portion 19.

Also, in the above-mentioned structure, the mounting cylindrical portion 19 of the inner knob 11, as shown in FIGS. 1 and 2, has substantially the same length as the knob mounting shaft 23 of the encoder 5 in the direction of the rotation axis 7 and, therefore, the end faces of the mounting cylindrical portion 19 and knob mounting shaft 23 are substantially coincident with each other. And, as shown in FIGS. 1 and 2, between the end face of the mounting cylindrical portion 19 and the front plate portion 15 of the outer knob 9, there is formed a clearance S.

While the structure of the operation tool 3 according to the present embodiment has been described heretofore, the present operation tool 3 can be manufactured in the following manner. Firstly, the outer knob 9 and inner knob 11 are formed using molds respectively. The respective parts can be easily manufactured even in case where a slide mold is not used.

Next, the inner knob 11 is assembled to the outer knob 9 to thereby provide the operation tool 3. At the then time, the inside cylindrical portion 17 of the inner knob 11 is pressure inserted into the outside cylindrical portion 13 of the outer knob 9. Further, the operation tool 3 is pressed against the knob mounting shaft 23 of the encoder 5 to thereby pressure insert the knob mounting shaft 23 of the encoder 5 into the mounting cylindrical portion 19. At the then time, the engaging projection 25 of the mounting cylindrical portion 19 is engaged into the engaging groove 27 of the knob mounting shaft 23. In this manner, the operation tool 3 is supported on the encoder 5.

Next, description will be given below of the operation of the operation tool 3 when a vehicle collision occurs. It is assumed now that a vehicle collision occurs and an occupant collides heavily with the operation tool 3. An impact force given to the operation tool 3 acts in a direction along the rotation axis 7. Due to the impact force, the bridge portion 31 of the crashable connecting portion 21 is broken and torn off. That is, the bridge portion 31 that is the weakest in the crashable connecting portion 21, especially, the bent portion or inner-peripheral-side end portion is crashed.

When the bridge portion 31 is crashed, the portions of the operation tool that are situated on the outside of the bridge portion 31, that is, the outer knob 9 and the like move toward the encoder 5. As shown in FIG. 1, between the front plate portion 15 of the outer knob 9 and the end face of the mounting cylindrical portion 19, there is present the clearance S. Until this clearance S disappears, that is, until the front plate portion 15 is contacted with the mounting cylindrical portion 19, the outer knob 9 and the like move toward the encoder 5. The clearance S corresponds to a variation in the projection quantity of the operation tool 3 caused by the crash and thus it can be referred to as a crash margin. The movement of the outer knob 9 causes the operation tool 3 to become dented, thereby being able to satisfy the requirements for enhancement in the safety of the occupant.

In the above operation of the operation tool 3 in a vehicle collision, the crashable connecting portion 21 is crashed but the mounting cylindrical portion 19 has no connection with the crashing operation. Therefore, even in case where the mounting cylindrical portion 19 is strongly mounted on the knob mounting shaft 23 of the encoder 5, the above-mentioned crash-connected operation can be carried out positively.

While the operation tool 3 according to the present embodiment has been described heretofore, in the present embodiment, the encoder 5 corresponds to the support member for supporting the operation tool 3, the outer knob 9 corresponds to the operation portion of the operation tool 3, and the mounting cylindrical portion 19 of the inner knob 11 corresponds to the mounting portion to be mounted onto the support member. According to the present embodiment, the mounting portion is disposed in such a manner that it is spaced apart from the operation portion by the clearance S in a direction where the impact acts on the operation tool. And, the crashable connecting portion is crashed due to the impact to thereby move the operation portion with respect to the mounting portion.

As described above, in the present embodiment, there is disposed the above crashable connecting portion and, therefore, the portion of the operation tool that bears the crashing function is separated from the mounting portion. When the impact acts on the operation tool, due to the crash of the crashable connecting portion, the operation portion is moved with respect to the mounting portion, thereby allowing the operation portion to be dented. Even in case where the mounting portion is mounted on the support member positively, the above-mentioned denting operation can be executed properly. Thanks to this, while securing the crashing function, the mounting function can be enhanced.

Now, let us compare the present embodiment with the conventional structure. In the conventional structure, as has been described with reference to FIG. 8, the crashing function is formed integrally with the mounting portion. That is, the crash structure is disposed in the portion to be mounted onto the support member. In this case, when a crash occurs, the mounting of the operation tool is removed. To secure the crashing function, there is required a mounting removal function for the impact acting time and, therefore, the reinforcement of the mounting portion is limited.

On the other hand, in the case of the present embodiment, the mounting portion and crashing function are separated from each other. A crash occurs in the connecting portion between the mounting portion and operation portion but no crash occurs in the portion for mounting the mounting portion onto the support member. And, due to the relative movement between the operation portion and mounting portion caused by the crashed connecting portion, that is, due to the internal crash and deformation of the operation tool, the denting operation of the operation tool can be realized. This can eliminate the need to remove the mounting of the mounting portion on the support member through the crash of the mounting portion as in the conventional structure. That is, since the removal of the mounting of the mounting operation is not necessary, even in case where the mounting portion is strong, a crashing function can be secured. Therefore, the crashing function and mounting function are easy to be compatible.

Also, in the conventional structure, as shown in FIG. 8, to dent the operation tool, the mounting portion must be spread and deformed in a trumpet manner. According to the present embodiment, however, since the mounting portion need not move, it need not be spread and deformed either. From this viewpoint as well, the mounting portion can be reinforced.

Also, as described above, in the present embodiment, the crashable connecting portion is extended radially from the mounting portion mounted on the shaft and is connected to the operation portion. Due to the radial structure of the crashable connecting portion, the crashable connecting portion can be structured such that it is strong in a direction perpendicular to the shaft, that is, in the present embodiment, it is strong in the rotation direction and in the radial direction and, at the same time, it is weak in the axial direction, that is, in the crashing direction.

Also, according to the present embodiment, the crashable connecting portion includes two or more bridge portions formed radially in a clearance existing between the mounting portion and operation portion so as to connect together these two portions. In the example shown in FIGS. 3A to 3C, the number of bridge portions is four. Thanks to provision of the bridge portions, the crashable connecting portion can be structured such that it is properly weak in the axial direction thereof, that is, in the crashing direction thereof.

Also, according to the present embodiment, the crashable connecting portion includes the bent portions between the mounting portion and operation portion. In more detail, according to the present embodiment, as shown in FIG. 1, in the end portions of the crashable connecting portion that are present outside the bridge portions thereof, that is, in the connecting portions between the bridge portions and ring-shaped plate portion, the crashable connecting portion is bent. Such bent structure can reduce the crashing-direction strength of the bridge portions to thereby be able to properly set the impact force to be provided when a crash occurs.

Also, as described above, according to the present embodiment, the operation tool is composed of the outer knob serving as the outside piece and inner knob serving as the inside piece. The inner tube portion of the inner piece is fitted with the outer tube portion of the outer piece, while the present inner tube portion and the mounting portion situated on the inner peripheral side of the inner tube portion are connected by the crashable connecting portion. Thanks to this structure, when obtaining a structure having a clearance to allow the operation portion and mounting portion to move with respect to each other, there can be eliminated the need for use of a slide mold or the like, which can facilitate the manufacture of the operation tool.

Next, description will be given below of modifications of the above-mentioned embodiment.

Figure 5A:
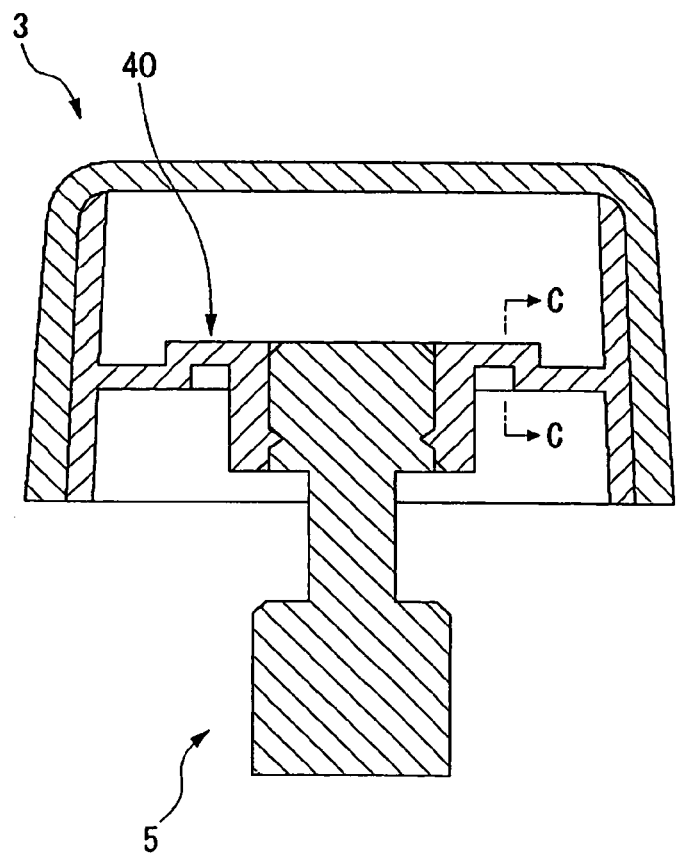
FIGS. 5A and 5B are sectional views of a modification of an operation tool in an electronic equipment according to the embodiment of the invention.
Figure 5B:
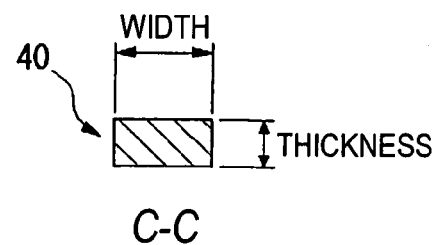

FIGS. 5A and 5B show a first modification, in which the section shape of the bridge portion is changed. That is, in the embodiment shown in FIG. 1, the section shape of the bridge portion 31 is substantially square; however, in the modification shown in FIG. 5A, the section shape of a bridge portion 40 is rectangular. Thus, as shown in FIGS. 5A and 5B, the axial-direction thickness of the bridge portion 40 is set smaller than the width thereof in a direction perpendicular to the shaft (in the present embodiment, the width in the rotation direction). Due to this structure, the crashing-direction strength of the operation tool can be lowered, thereby being able to properly set the impact force to be generated when the crash occurs.

Figure 6:
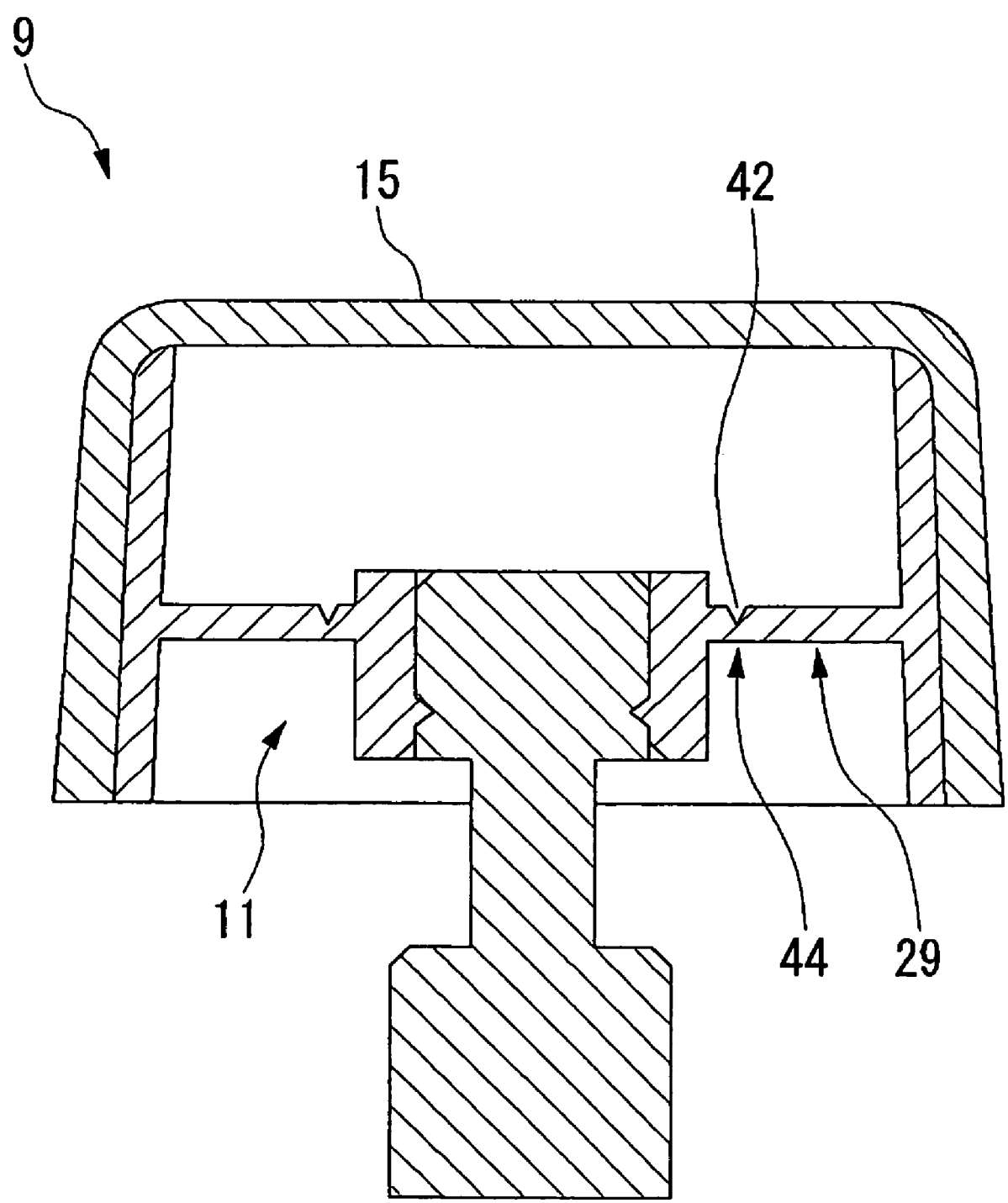
FIG. 6 is a sectional view of a second modification of an operation tool in an electronic equipment according to the embodiment of the invention.

FIG. 6 shows a second modification, in which a cut-away portion 42 is formed in the crashable connecting portion. The cut-away portion 42, in the present embodiment, is formed as a groove and can be formed at the time when the inner knob 11 is formed of resin. The cut-away portion 42 is formed in the end portion of a bridge portion 44. The cut-away portion 42 is formed in one of the surfaces of the bridge portion 44 that faces the front plate portion 15 of the outer knob 9 and, therefore, the cut-away portion 42 has a depth in the direction of the rotation axis 7. Such formation of the cut-away portion 42 eliminates the bent portion of the crashable connecting portion.

According to this structure, thanks to provision of the cut-away portion 42, the crashing-direction strength of the bridge portion is lowered, which makes it possible to properly set the impact force to be generated when the crash occurs. By the way, without departing from the scope of the invention, the cut-away portion is not limited to the groove but a slit may also be used.

FIGS. 7A to 7C are typical views of a still further modification. In FIG. 7A, similarly to the embodiment shown in FIG. 1, there is provided a crashable connecting portion 46 so as to extend perpendicularly to the rotation axis. On the other hand, in FIG. 7B, a crashable connecting portion 48 is disposed so as to be inclined to the rotation axis. The crashable connecting portion 48 is disposed in such a manner that it approaches the front plate portion 15 of the outer knob 9 as it goes outwardly. Also, in FIG. 7C as well, a crashable connecting portion 50 is disposed so as to be inclined to the rotation axis. However, in FIG. 7C, the crashable connecting portion 50 is disposed in such a manner that it parts away from the front plate portion 15 of the outer knob 9 as it goes outwardly. In this manner, the crashable connecting portion may also be formed inclined with respect to the rotation axis.

The invention is not limited to the above-mentioned embodiment. For example, the bridge portion may be longer; and, the number of bridge portions may not be four but the number may be larger or smaller, or may be two. The two or more bridge portions may not be disposed at regular intervals. Also, it is also possible to employ a structure in which no bridge portion is included. Also, the embodiment shown in FIG. 1 and the modifications shown in FIGS. 5A to 7C may also be combined together. What is necessary is to structure the crashable connecting portion in such a manner that it can be crashed with a proper impact force in order to be able to meet the requirements for the collision occupant safety within the scope of the invention.

Further, it goes without saying that the above-mentioned embodiment can be deformed properly by a person skilled in the art within the scope of the invention. For example, the invention is not limited to a volume knob or the operation tool of a car audio; and, the operation tool may be formed so as to be unrotatable, for example, it may be a button. In this manner, the invention can be applied to an arbitrary operation tool of an electronic equipment.

As has been described heretofore, according to the invention, since there is employed a structure in which the operation portion and mounting portion of the operation tool are connected together by the crashable connecting portion, even in case where the mounting portion is positively mounted on the support member, the denting operation of the operation tool can be carried out properly due to the crash of the crashable connecting portion in a collision, so that, while securing the crashing function, the mounting function can be enhanced. Therefore, it is possible to provide an electronic equipment having an effect that the two functions can be properly compatible.

What is claimed is:

1. An operation tool to be mounted on a support member; wherein said operation tool includes:
   an operation portion to be operated by an operator;
   a mounting portion formed spaced apart from the operation portion in a direction where an impact is applied to the operation tool, the mounting portion being arranged to be mounted on fixed to the support member; and
   a crashable connecting portion for connecting together the operation portion and the mounting portion, the crashable connecting portion being adapted to be crashed upon an impact force exerted on the operation portion such that when the crashable connecting portion is crashed, the operation portion moves with respect to the mounting portion,
   wherein said crashable connecting portion radially extends from the mounting portion to the operation portion, and
   wherein said crashable connecting portion includes plural bridge portions radially extending between the mounting portion and the operation portion so as to connect together said mounting portion and said operation portion,
   wherein each of the bridge portions has a cross section of which the thickness, in a direction along a shaft, is smaller than the width thereof, in a direction perpendicular to the shaft.

2. The operation tool according as set forth in claim 1, wherein a portion of the crashable connecting portion is bent along a length of the crashable connecting portion.

3. The operation tool according to claim 1, wherein the crashable connecting portion has a cut-away portion between the mounting portion and the operation portion.

4. The operation tool according to claim 1, further comprising:
   an outside piece including an outer tube portion constituting the operation portion; and
   an inside piece including an inner tube portion to be fitted with the outer tube portion;
   wherein the inside piece has a structure in which the inner tube portion and the mounting portion on the inner peripheral side thereof are connected together by the crashable connecting portion.

5. The operation tool of claim 1, wherein the mounting portion does not move upon the impact force exerted on the outer knob.

* * * * *